March 27, 1928. 1,663,702
W. D. HIMES
PIPE COUPLING
Filed March 10, 1924
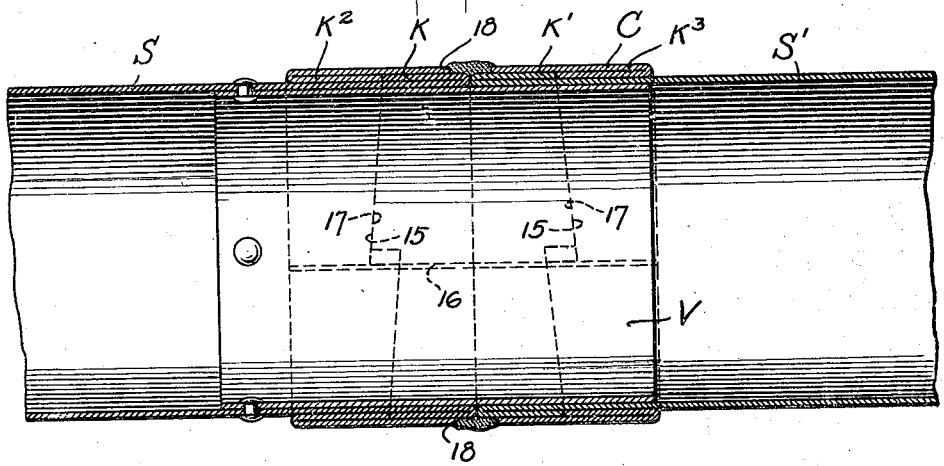
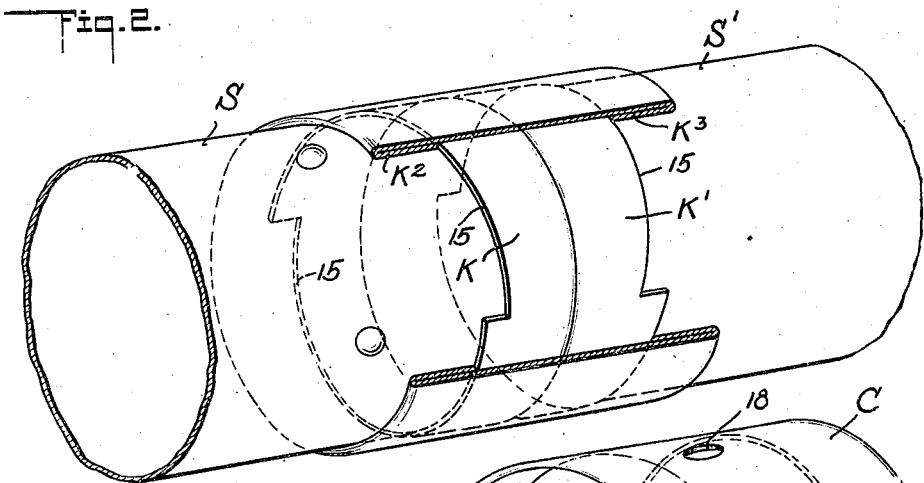
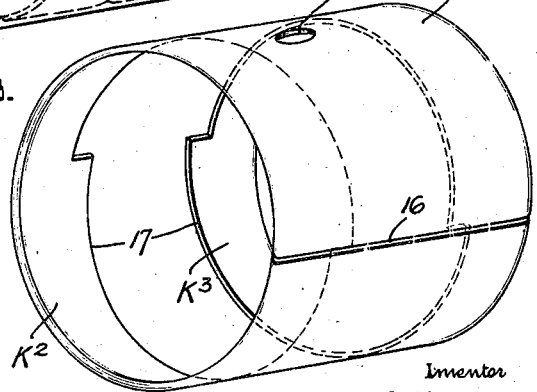
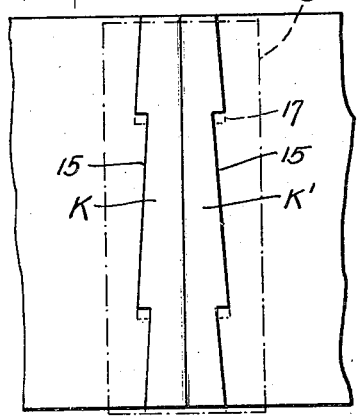
Inventor
WILLIAM D. HIMES
By Munn & Co.
Attorneys Patented Mar. 27, 1928.

1,663,702

UNITED STATES PATENT OFFICE.

WILLIAM D. HIMES, OF LOS ANGELES, CALIFORNIA, ASSIGNOR TO LOS ANGELES MANUFACTURING COMPANY, OF LOS ANGELES, CALIFORNIA, A CORPORATION OF CALIFORNIA.

PIPE COUPLING.

Application filed March 10, 1924. Serial No. 698,170.

My invention relates to pipe couplings and particularly, although not necessarily, to couplings for the sections of well casing.

It is a purpose of my invention to provide a coupling for well casing sections which has the following advantages: Extreme simplicity in construction, permitting low cost of manufacture, a coupling which facilitates the connecting of casing sections by reducing the time required, as well as reducing the number of hands heretofore necessary to install, firmly holding the casing sections against separation, and thoroughly reinforcing the casing sections at the joints against longitudinal, internal as well as external strains and stresses.

I will describe only one form of pipe coupling embodying my invention, and will then point out the novel features thereof in claims.

In the accompanying drawings

Figure 1 is a view showing in longitudinal section the confronting ends of a pair of pipe or well casing sections, having applied thereto one form of coupling embodying my invention;

Figure 2 is a perspective view of the casing sections and coupling shown in Figure 1, with a portion of the latter broken away;

Figure 3 is an enlarged detail perspective view of the coupling collar embodied in the coupling shown in the preceding views;

Figure 4 is a view showing the pattern from which the casing part of the coupling is formed, and with the collar part of the coupling in dot and dash lines, and in its proper relative position.

Referring specifically to the drawings, in which similar reference characters refer to similar parts, my invention in its present embodiment comprises pipe or well casing sections S and S' hereinafter referred to as pipe sections, one of which is provided with the usual connecting sleeve V (Figure 1) riveted to the section S and projecting beyond the end thereof so as to be received in the section S' and thus bridge the joint between the two. The confronting or abutting ends of the pipe sections S and S' are formed with two annular series of complemental cams K and K' respectively, the cams of each series being arranged circumferentially of the pipe section and having spirally disposed edges 15. In the present instance I have shown two cams in each series, and the cam edges 15 of one series are arranged in divergent relation with respect to the cam edges of the other series so as to produce in effect two single cams which are graduated in width from one end to the other, and with the wide end of one cam abutting the narrow end of the other cam. These cams K and K' are in the present instance formed from the end portions of the pipe sections S and S', such end portions being bent rearwardly upon themselves to lie contiguous to the outer walls of the pipe sections and having their free edges formed to provide the cam edges 15. Although I have described two cams in each series it is to be understood that any number of cams can be employed without departing from the spirit of the invention.

Embodied in the coupling is a coupling sleeve or collar C which, as clearly illustrated in Figure 3, is split as indicated at 16, to permit of its application to the pipe sections. This collar C is provided internally with complemental cams $K^2$ and $K^3$ having cam edges 17 arranged spirally of the collar in the same manner as, but reversely to, the cam edges 15 of the cams K and K'. To correspond with the cams K and K' the series of cams $K^2$ and $K^3$ each include two single cams which are formed by bending the marginal edges of the collar inwardly and forming the free edges of these inwardly bent portions to provide the cam edges 17. In this manner spaces are provided between the cams $K^2$ and $K^3$ to accommodate the cams K and K' when the collar C is in applied position upon the pipe sections, and in which applied position the cam edges 15 and 17 cooperate when the collar C is rotated upon the pipe sections to draw the pipe sections together and firmly hold the same against separation. Subsequent to the application of the collar C the split portion 16 is welded so as to make a continuous collar incapable of enlargement, so that its cam edges 17 will properly co-operate with the cam edges 15 in holding the pipe ends in abutting relation.

In practice, the pipe ends are arranged in abutting relation and the collar C then applied, so that the cams K and K' are received between the cams $K^2$ and $K^3$. Upon rotation of the collar C in the proper direction the cam edges 17 slide on the cam edges 15 to force the pipe ends together. This may be accomplished through the use of a spanner wrench applied in openings 18 of the collar C, such openings, after the application of the collar, being spot welded as shown in Figure 1 and thereby serving to lock the collar in applied position so as to maintain the cams $K^2$ and $K^3$ in firm contact with the cams K and K' to prevent any play in the parts comprised in the coupling and thus firmly hold the pipe sections against separation.

A pipe coupling constructed in accordance with my invention thoroughly reinforces the connected ends of the pipe sections against internal as well as external stresses and strains, it being particularly noted that four layers of metal are provided at the joint, as clearly illustrated in Figure 1. Further, the coupling is reinforced against longitudinal strains and stresses through the cooperation of the cams K and $K^3$ inclusive, it being manifest that in the case of well casings the depending casing sections will be supported by the collar and cams of the coupling.

Although I have herein shown and described only one form of pipe coupling embodying my invention, it is to be understood that various changes and modifications may be made herein without departing from the spirit of the invention and the spirit and scope of the appended claims.

What is claimed is:

1. A method of constructing pipe couplings which comprises the shaping of the edges of the confronting ends of two pipe sections to form complemental cam edges, bending the confronting pipe ends rearwardly in reverse directions upon the respective pipe sections to dispose the cam edges exteriorly of and contiguous to the pipe sections, shaping the outer edges of a split collar to form complemental cam edges, bending the cam edges inwardly of the collar so as to lie within and contiguous to the collar, and permanently securing the ends of the collar together subsequent to its application to the pipe ends so that the cam edges of the pipe sections are received between the cam edges of the collar in a manner to coact with the latter when the collar is rotated on the pipe sections for the purpose described.

2. In combination, a pair of pipe sections arranged in end to end relation and provided exteriorly with continuous annular flanges extending in reverse directions from the meeting ends of the sections, the edges of the flanges remote from said meeting ends being shaped to provide complemental cams, and a collar on the pipe sections provided interiorly with continuous annular flanges extending inwardly from the ends of the collar so as to receive therebetween the flanges of the pipe sections, the confronting edges of the collar flanges being shaped to provide cams complemental to and engaging the cam edges of the pipe section flanges so as to coact with the latter when the collar is rotated on the pipe sections in drawing and holding the latter together.

WILLIAM D. HIMES